Jan. 8, 1963 H. M. FULDNER 3,072,236

PROGRAMMING APPARATUS

Filed Dec. 19, 1958

10 Sheets-Sheet 1

INVENTOR.
HERBERT M. FULDNER

BY
Howard A Keiser
John F. Verhoeven
ATTORNEYS

INVENTOR.
HERBERT M. FULDNER
BY Howard S. Keiser
John F. Verhoeven
ATTORNEYS

INVENTOR
HERBERT M. FULDNER
BY
Howard J. Keiser
John F. Verhoeven
ATTORNEYS

INVENTOR.
HERBERT M. FULDNER
BY
Howard D Keiser
John F. Verhoeven
ATTORNEYS

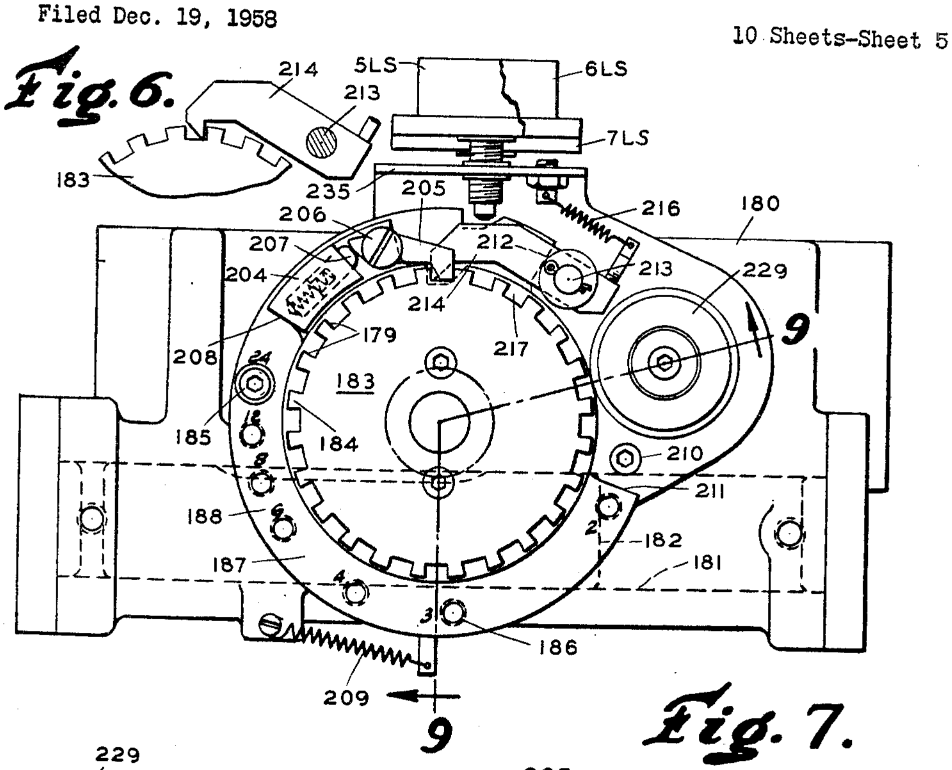
Fig. 6. Fig. 7.
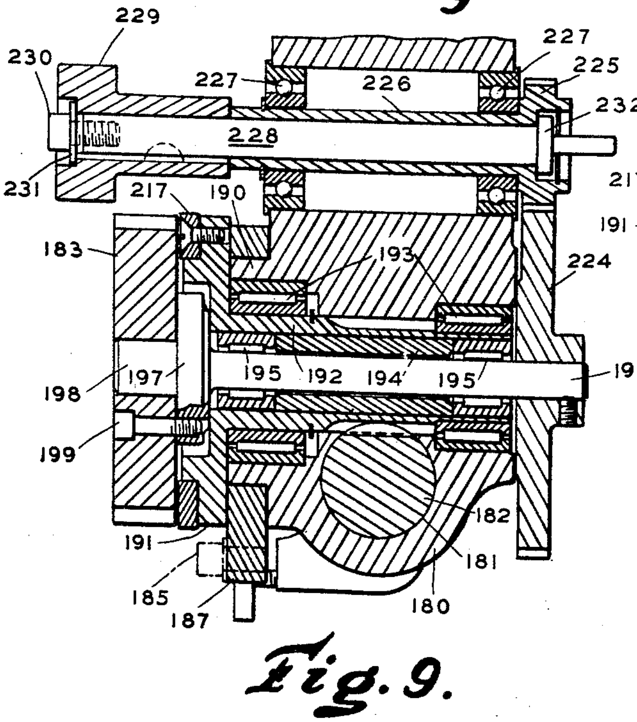
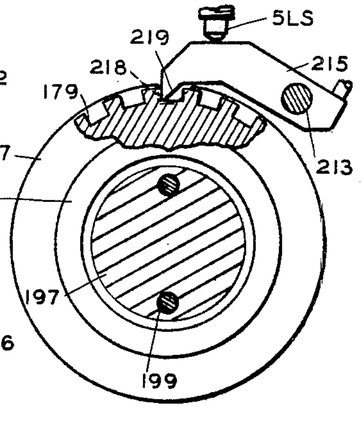
Fig. 8.
Fig. 9.
INVENTOR.
HERBERT F. FULDNER
BY
Howard L. Keiser
John F. Verhoeven
ATTORNEYS INVENTOR.
HERBERT M. FULDNER
BY
Howard D. Keiser
John F. Verhoeven
ATTORNEYS INVENTOR.
HERBERT M. FULDNER
BY
Howard S. Keiser
John F. Verhoeven
ATTORNEYS

INVENTOR.
HERBERT M. FULDNER

BY
Howard D. Keiser
John F. Verhoeven
ATTORNEYS

INVENTOR.
HERBERT M. FULDNER
BY
Howard A. Kiser
John F. Verhoeven
ATTORNEYS

Jan. 8, 1963 H. M. FULDNER 3,072,236

PROGRAMMING APPARATUS

Filed Dec. 19, 1958

10 Sheets-Sheet 10

INVENTOR.
HERBERT M. FULDNER
BY
Howard A. Keiser
John F. Verhoeven
ATTORNEYS 3,072,236
Patented Jan. 8, 1963

3,072,236

PROGRAMMING APPARATUS

Herbert M. Fuldner, Fort Thomas, Ky., assignor to The Cincinnati Milling Machine Co., Cincinnati, Ohio, a corporation of Ohio Filed Dec. 19, 1958, Ser. No. 781,614
1 Claim. (Cl. 192—142)

This invention relates to improvements in automatic cycle control mechanism for machine tools, and more specifically has to do with a novel arrangement of selector switches, limit switches, trip dogs and a sequencing device for putting a machine tool through a predetermined cycle of events in accordance with a prearranged setting of the selector switches.

In accordance with present day manufacturing requirements, machine tools must be capable of performing their functions automatically with a minimum amount of attention on the part of the operator. At the same time, in order to obtain the advantages of automation on small production runs, there is a requirement for automatic machine tools of greater versatility. In other words, the machine tool must be designed to permit a quick changeover from one set of operating conditions to another in order to permit small production runs to be handled economically. This requirement necessitates the use of a programming mechanism which will enable the automatic cycle to be quickly and readily changed by the operator from one sequence of events to another when a different part is to be run on the machine. The present invention is directed to an automatic cycle programming mechanism which is designed to meet this need for a rapid changeover in the set up of the machine to thereby render small production runs feasible and also to permit the economies resulting from full automatic operation on such runs to be fully realized.

Accordingly, it is an object of this invention to provide an automatic cycle control mechanism for machine tools which will permit a quick changeover from one type of automatic cycle to another.

Another object of the invention is to provide, in a programming mechanism for a machine tool, a manually operable selection mechanism for determining the sequence of operation of the machine tool during an automatic cycle.

Another object of the invention is to provide a programming mechanism for machine tools in which a sequencing device which is controlled by movements of elements of the machine, effects the selection of the next event in the cycle as determined by a preconditioned selection mechanism.

Another object of the invention is to provide a programming mechanism for machine tools in which movement of a machine tool slide is stopped simultaneously with the initiation of operation of the sequencing device.

Another object of the invention is to provide a programming mechanism for machine tools in which movement of a slide may be continued at a different rate following the operation of the sequencing device.

With these and other objects in view, which will become apparent from the following description, the invention includes certain novel features of construction and combinations of parts, the essential elements of which are set forth in the appended claims, and a preferred form or embodiment of which will hereinafter be described with reference to the drawings which accompany and form a part of this specification.

Figure 3A:
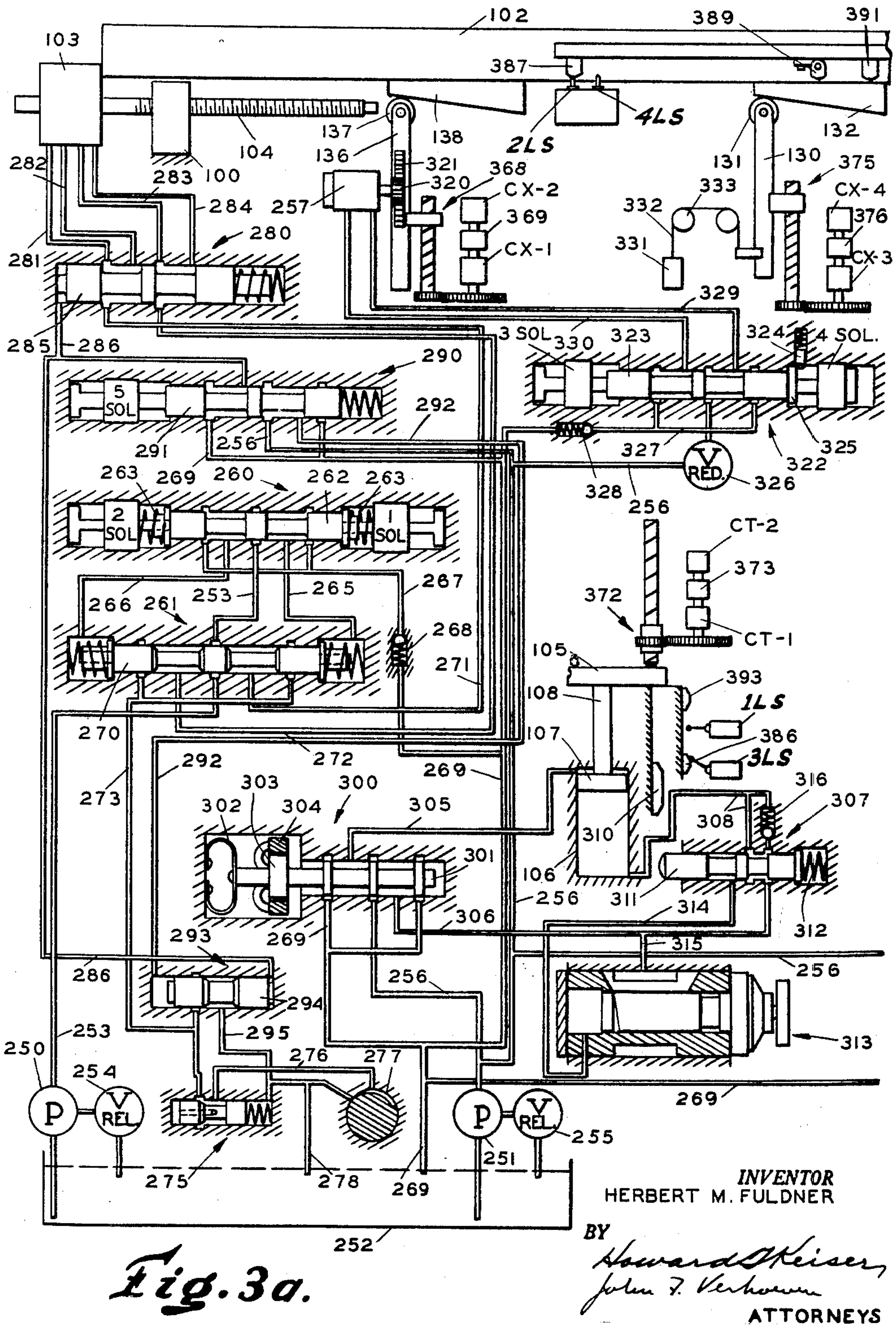
Figure 3B:
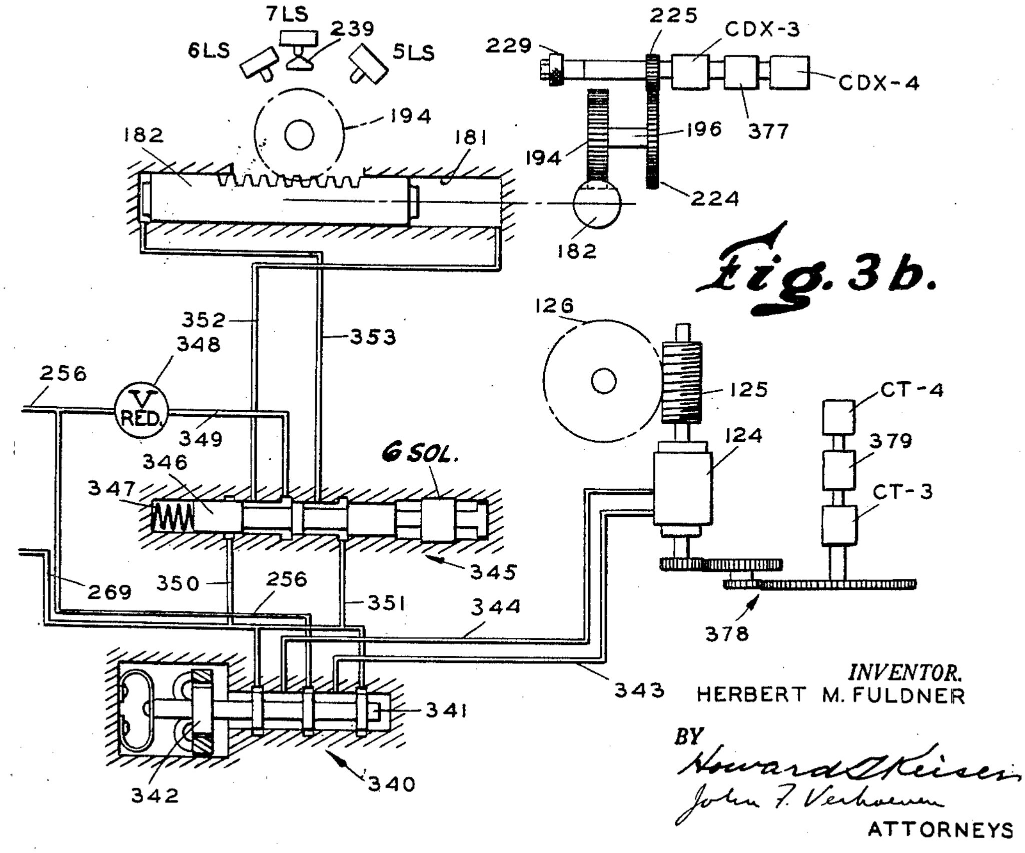

FIGS. 3*a* and 3*b* together constitute a hydraulic diagram of the machine.

Figures 4, 5:
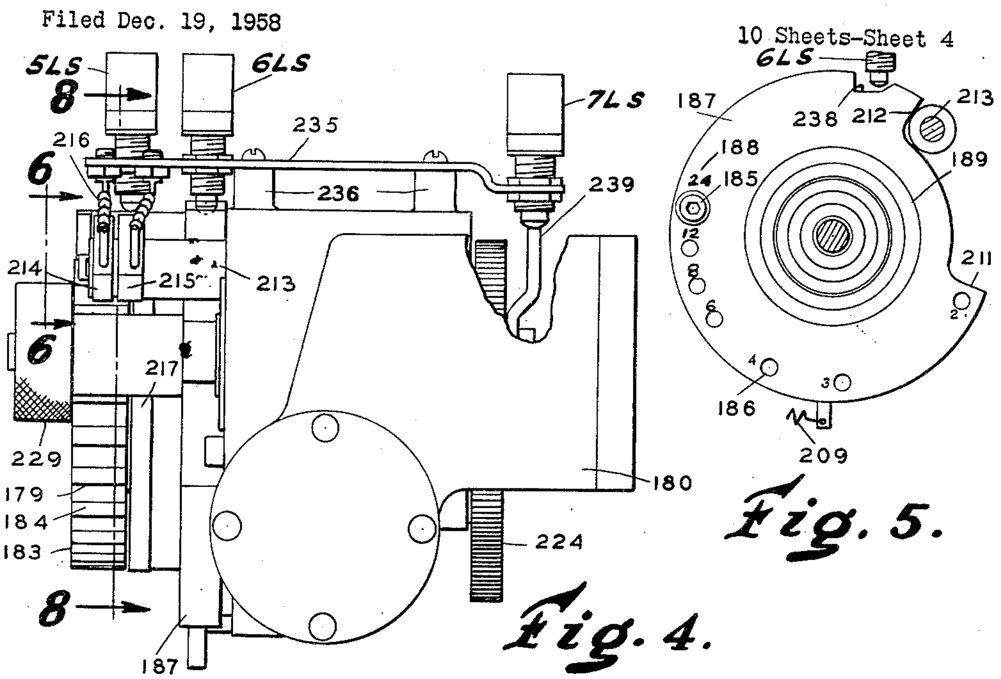

FIG. 4 is a side elevation of the headstock spindle indexing mechanism.

FIG. 5 is a view showing a detail of the indexing mechanism.

FIG. 6 is a fragmentary view of a portion of the indexing mechanism taken along the line 6—6 in FIG. 4.

FIG. 7 is a front view of the indexing mechanism.

FIG. 8 is a cross-sectional view taken along the line 8—8 in FIG. 4 with parts broken away.

FIG. 9 is a cross-sectional view taken along the line 9—9 in FIG. 7.

Figures 10, 11:
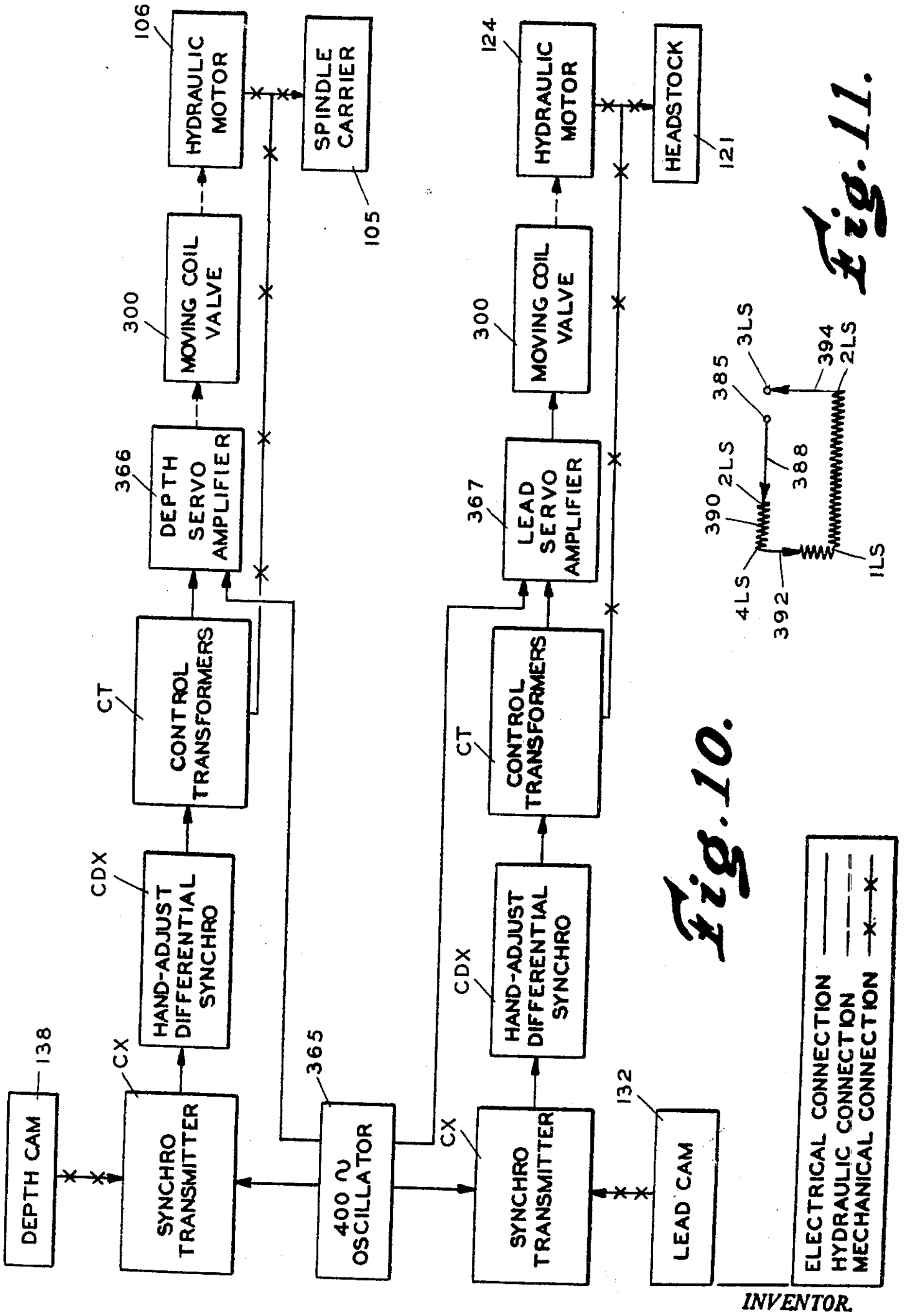

FIG. 10 is a block diagram showing the arrangement of the depth and lead servo-mechanisms.

FIG. 11 is a diagrammatic view illustrating a typical machine cycle.

Figure 12:
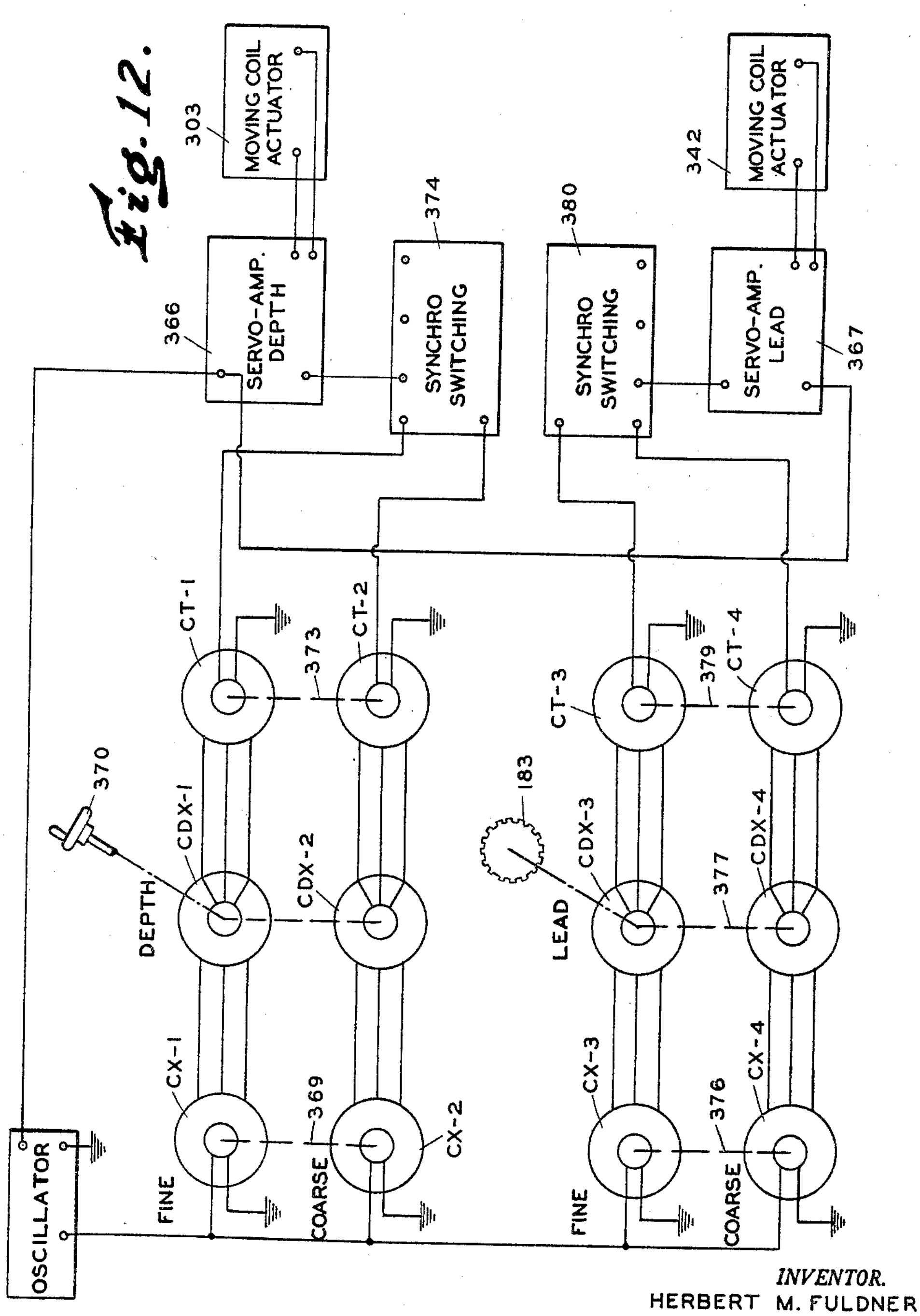

FIG. 12 is a block diagram showing the connections of the synchros employed in the depth and lead servo-mechanisms.

Figure 13A:
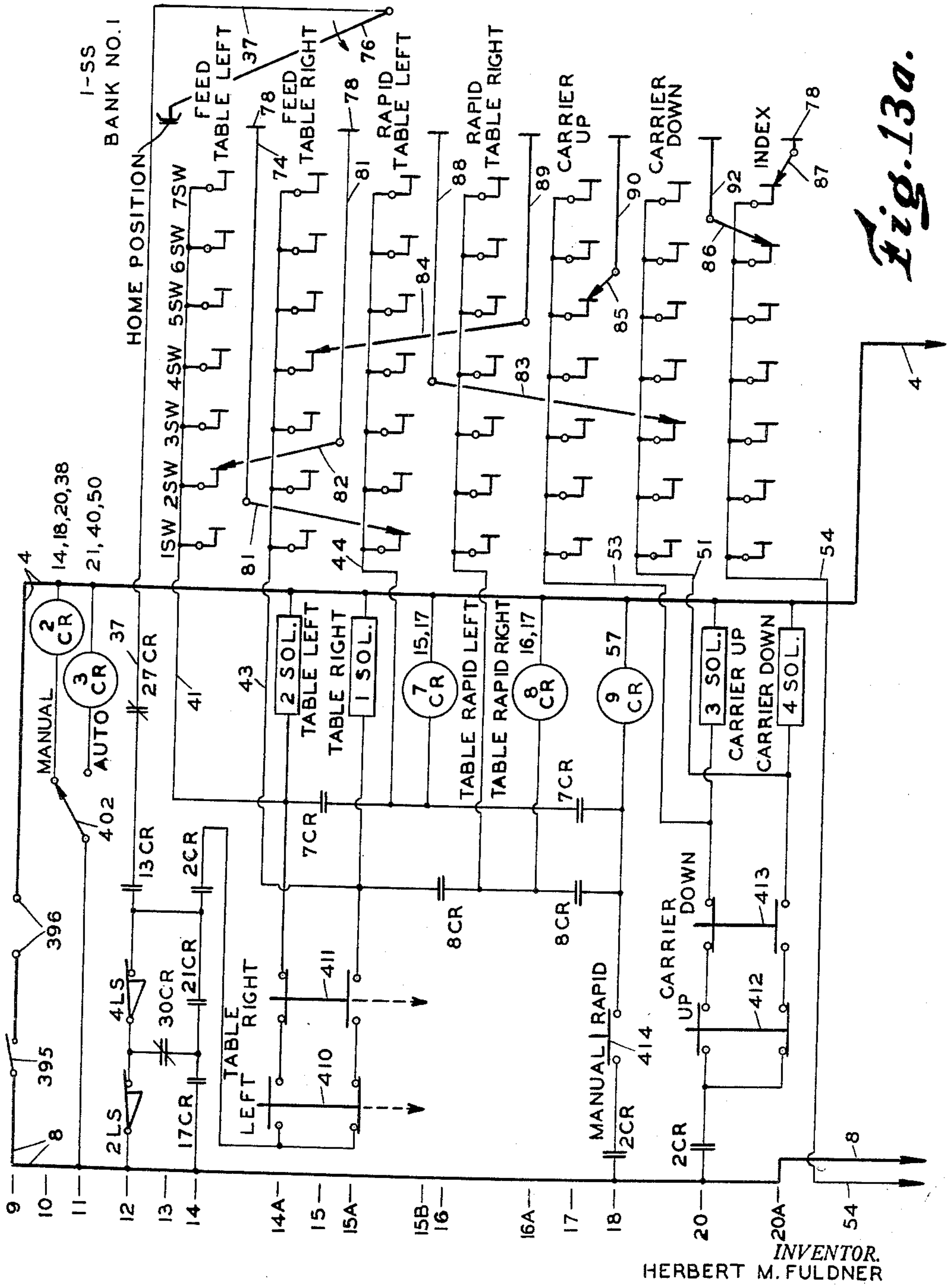
Figure 13B:
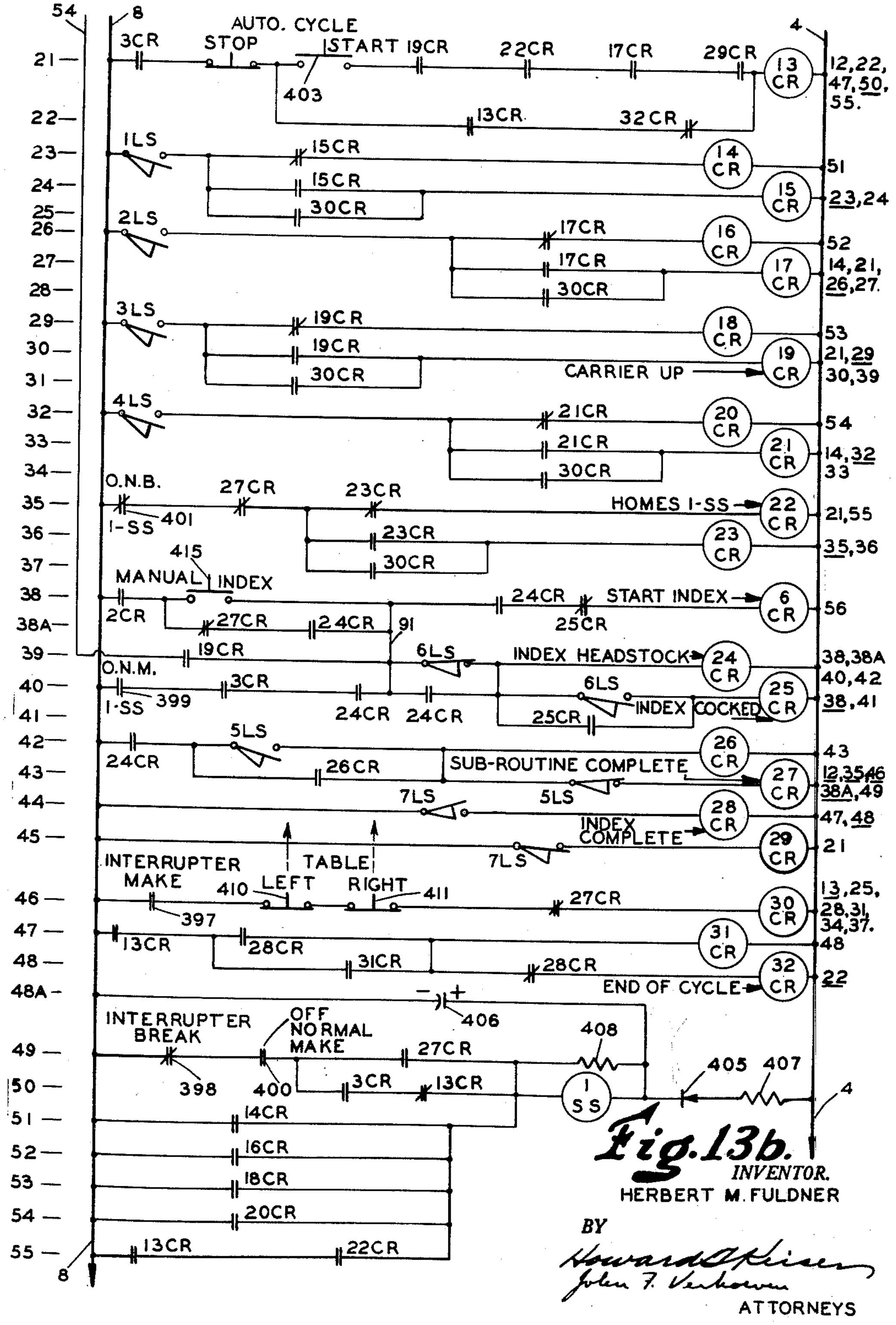
Figure 13C:
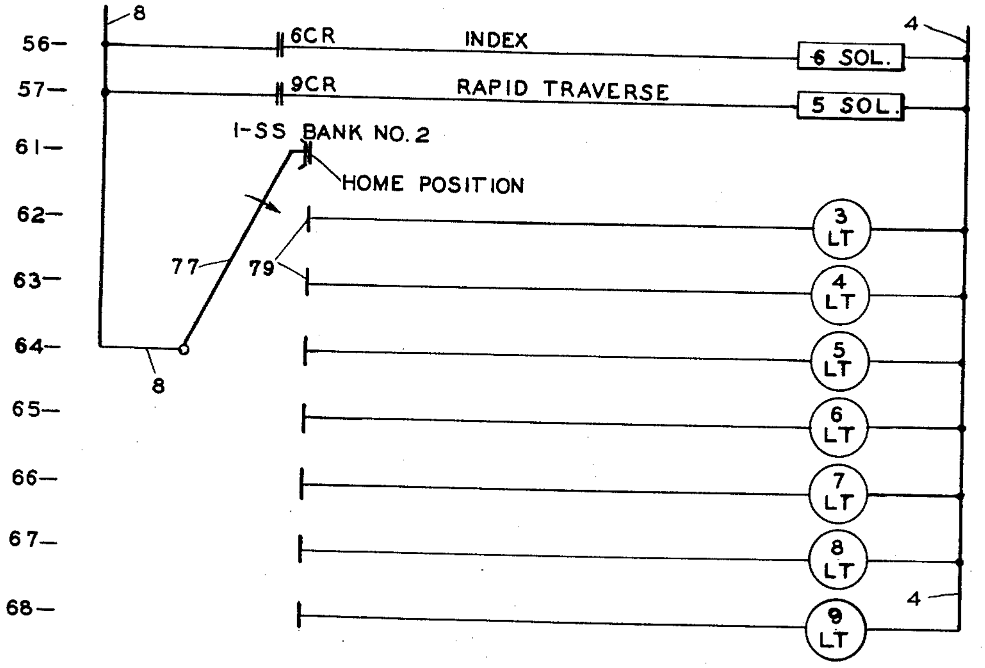

FIGS. 13*a*, 13*b*, and 13*c* together constitute a wiring diagram of the electrical controls for the machine.

In the following description, similar reference characters are used to designate similar or identical elements and portions throughout the specification and throughout the different views of the drawings.

The invention is shown herein as applied to a fixed bed type milling machine which is especially suited to the automatic production of spiral fluted parts. It will be realized, however, as the description proceeds, that the invention could be applied with equally satisfactory results to other types of milling machine structures.

*Machine Tool Structure*

Figure 1:
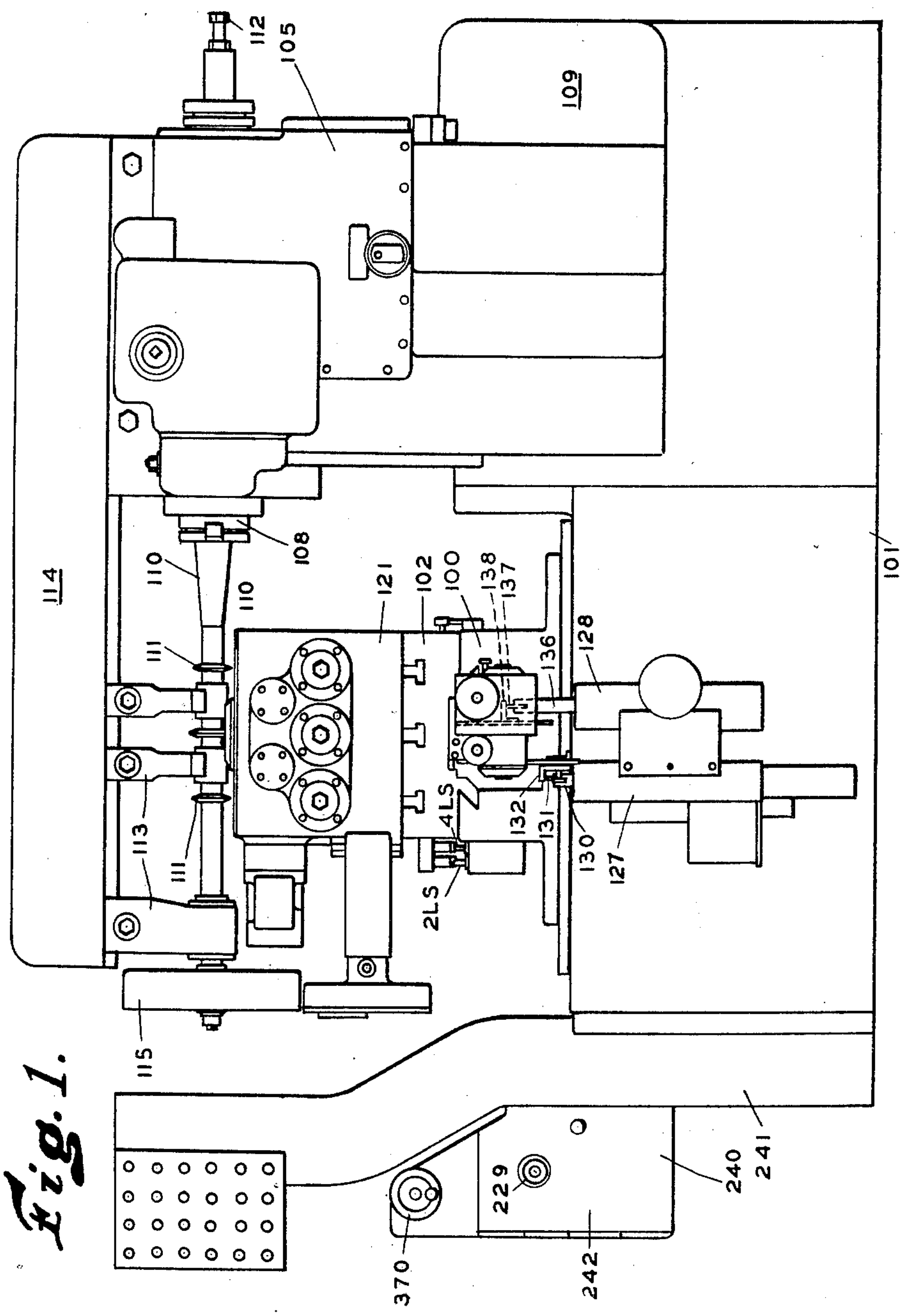
FIG. 1 is a right hand end view of a spiral milling machine to which the present invention has been adapted.
Figure 2:
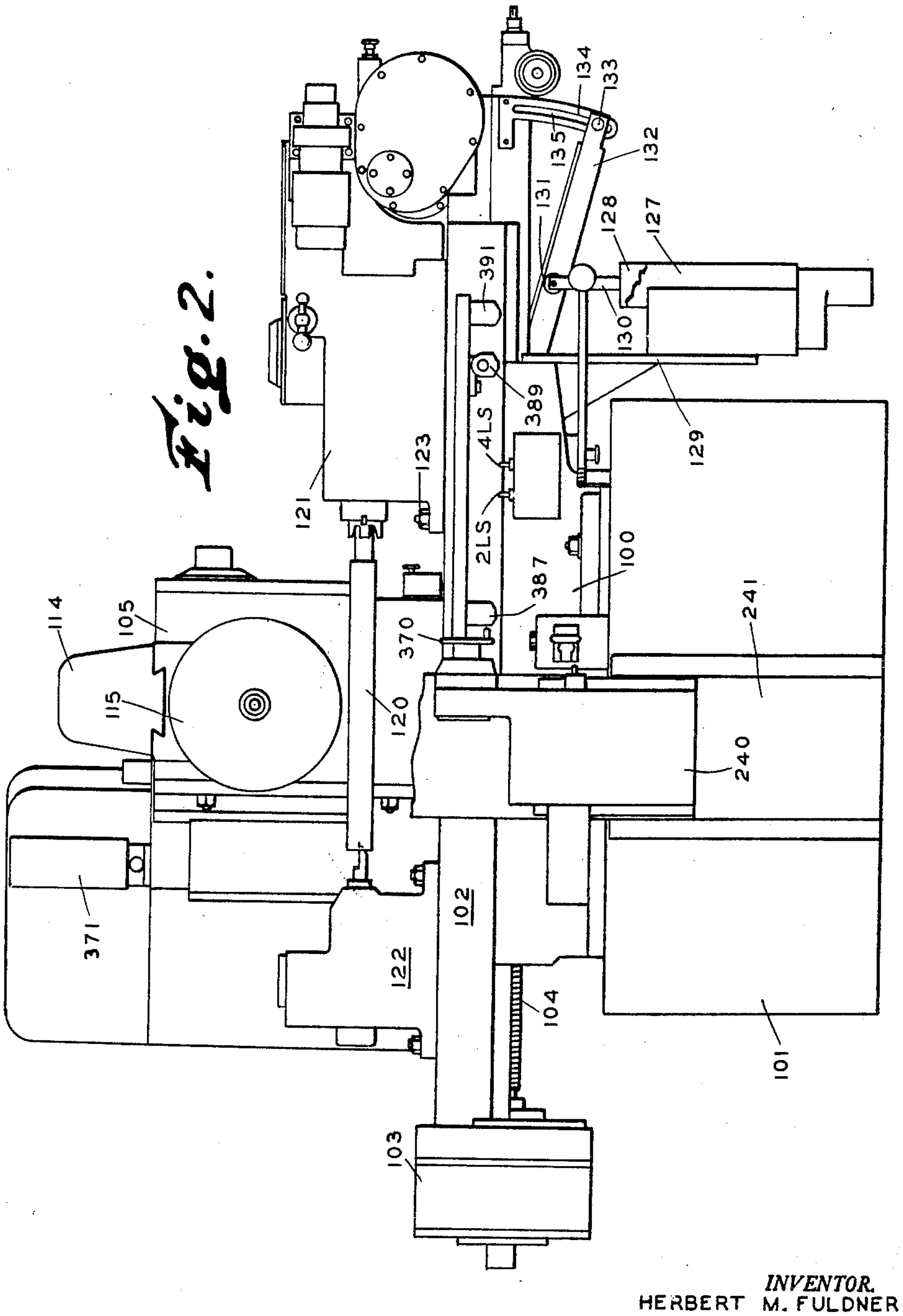
FIG. 2 is a front view of the machine shown in FIG. 1.

In FIGS. 1 and 2 of the drawings there is shown a fixed bed type production milling machine in which a saddle 100 is mounted for pivotal movement on a machine base or bed 101 by means of a suitable trunnion (not shown) extending vertically from the bed and received in suitable bearings provided in the saddle. The saddle is provided on its upper surface with dovetail ways for receiving and guiding a table 102 for rectilinear movement on the saddle. Traversing movement of the table on the saddle is effected by a hydraulic motor 103 mounted on the left hand end of the table as shown in FIG. 2. This motor drives a lead screw 104 which meshes with a nut fixed to the saddle whereby rotation of the feed screw will cause traversing movement of the table on the saddle. The rear portion of the bed 101 is provided with an upstanding column on which a spindle carrier 105 is supported for vertical sliding movement by means of suitable ways extending vertically along the column. Movement of the spindle carrier along the ways is effected by means of a hydraulic cylinder 106 which is shown diagrammatically in FIG. 3*a*. As therein indicated, the cylinder is secured to the bed of the machine while a piston 107 working in the cylinder is connected by a piston rod 108 to the spindle carrier 105 to raise and lower the carrier as hydraulic fluid is admitted to one end or the other of the cylinder 106.

Referring again to FIG. 1, the carrier 105 is fitted with a spindle 108 which is arranged to be driven by a motor 109 through a conventional transmission housed within the spindle carrier. An arbor 110, on which are mounted cutters 111, is attached to the spindle 108 and held securely therein by means of a drawbolt 112. The arbor 110 is supported along its length by arbor supports 113 which are mounted on an overarm 114 attached to the spindle carrier 105. A flywheel 115 may be mounted on the outer end of the arbor 110 to smooth out the impulses resulting from contact of the individual teeth of cutters 111 with the work.

*Work Fixture*

The parts to be milled are supported on the table 102 by means of a work fixture shown in FIGS. 1 and 2. As therein shown, the workpieces 120 to be machined are supported between centers by a headstock 121 and tailstocks 122 to permit rotation of the work as the table is traversed along the saddle, and also to permit indexing of the workpieces after each flute has been cut therein. For this purpose the headstock, which is arranged to be secured by bolts 123 to the table 102, is fitted with as many spindles as there are workpieces to be machined on each operation of the machine tool. In the present embodiment of the invention, the machine is adapted to mill flutes in three workpieces simultaneously and, accordingly, the headstock 121 is provided with three spindles which lie in a horizontal plane. The headstock spindles are carried by quills which are supported for longitudinal sliding movement in the headstock to permit longitudinal staggering of the workpieces as is made necessary by the angular setting of the table relative to the arbor 110 to provide the proper helix angle to the flutes being cut in the workpieces.

Each spindle is also journaled for rotation about its longitudinal axis and all of the spindles are arranged to be rotated simultaneously in the same direction by a hydraulic motor 124 (FIG. 3*b*) mounted on the side of the headstock. As shown in FIG. 3*b*, the hydraulic motor drives a worm 125 which is journaled for rotation in the headstock and meshes with a worm wheel 126 which is drivingly connected with the spindles to rotate them in unison.

*Lead and Depth Tracers*

In order to machine helical flutes in the workpieces 120, it is necessary that the rotation of the headstock spindle be synchronized with table movement so as to provide the flutes with the desired lead. Also, if the flutes are to be tapered from one end of the work to the other, vertical movement of the spindle carrier must also be coordinated with the movement of the table. For this purpose, the machine tool is provided with a lead tracer 127 (FIGS. 1 and 2) and a depth tracer 128 both of which are mounted on a bracket 129 secured to the saddle 100. The lead tracer is provided with a stem 130 mounted for longitudinal sliding movement within the tracer body and carrying a roll 131 which contacts a lead cam 132 carried by the table. The left hand end of the cam 132, as viewed in FIG. 2, is supported on a pivot pin carried by the table while at its outer end the cam is provided with a thumb screw 133 which cooperates with an arcuate slot 134 provided in a bracket 135 carried by the table. Hence, by loosening the thumb screw 133 the cam 132 may be swung about its pivot to any desired angle, as permitted by the slot 134, and thereby enable the required lead to be set into the machine.

The depth tracer 128 is similarly arranged and is provided with a slidable stem 136 (FIG. 1) which carries a roll 137 cooperating with a depth cam 138. The cam 138, like the cam 132, is pivoted at one end to the table and is adjustable to various angles of inclination to enable the required taper to be produced in the part.

In a manner hereinafter to be described, the lead tracer 127 is connected through a servo-mechanism with the hydraulic motor 124 (FIG. 3*b*) and causes the motor to be rotated in synchronism with the displacement of the stem 130 of the tracer. In a like manner, the depth tracer 128 is connected by a servo-mechanism with the hydraulic cylinder 106 (FIG. 3*a*) and causes the spindle carrier 105 to be moved in synchronism with the movement of the stem 136 of the tracer.

*Indexing Mechanism*

The mechanism for indexing the headstock spindles from one flute to the next at the end of each pass of the table is shown in FIGS. 4 to 9, inclusive. As therein shown, the indexing mechanism includes a frame casting 180 provided with a cylindrical bore 181 containing a rack piston 182 which is arranged to be reciprocated within the cylinder for the purpose of actuating the indexing mechanism. The mechanism also includes an indexing disc 183 which contains, in the present embodiment of of the invention, twenty-four square teeth 184 spaced about its periphery. Provision is made for advancing the disc through a distance of from one to twelve teeth on each reciprocation of the rack piston 182. Hence, each time the disc is advanced a distance of one tooth, it will be turned through an angle of 15° and the mechanism will thereby provide twenty-four equal steps of movement per revolution of the disc. If the disc is advanced two teeth at a time, it will be turned through an angle of 30° and twelve equal steps of 30° each will be provided on each revolution of the disc. Similarly, an advance of three teeth will result in eight steps of movement per revolution; four teeth will provide six steps; six teeth will provide four steps; eight teeth will provide three steps, and twelve teeth will provide two steps per revolution.

The precision with which the indexing movement is effected by the present mechanism is determined by the spacing between corresponding surfaces on each of the teeth 184 on the disc. For this reason, each tooth is provided with a finished surface 179 on one side thereof and the spacing between the surface 179 is held to close tolerances in the manufacture of the disc 183.

The extent to which the disc is advanced on each operation of the indexing mechanism is determined by the position of a screw stud 185 which may be screwed into any any one of seven tapped holes 186 provided in a stop plate 187 (FIG. 5). Suitable numbers 188 (FIGS. 5 and 7) are inscribed on the plate adjacent each hole 186 to indicate the number of steps of movement per revolution of the disc when the screw stud is placed in that particular hole.

The stop plate 187 is provided with a large central aperture 189 which fits over a cylindrical boss 190 (FIG. 9) machined on the frame casting 180. The stop plate is held in place on the boss 190 by a flange 191 formed on one end of a pinion sleeve 192. This sleeve is journaled in bearings 193 which are received in a cylindrical bore provided in the frame casting 180. The sleeve 192 is provided with gear teeth 194 which mesh with the teeth of rack piston 182 as shown in FIG. 9. Journaled within the sleeve 192 by means of bearings 195 is a shaft 196 which, at its forward end, is provided with a flange 197 and a tenon 198. The indexing disc 183 is provided with a center hole which fits over the tenon 198 and the disc is held against the flange 197 by screws 199.

The flange 191 on the pinion sleeve 192 carries a block 204 (FIG. 7) which overlies the periphery of the indexing disc 183. A driving pawl 205 is pivotally supported on the block 204 by means of a screw 206. The pawl is urged into engagement with the teeth 184 by a spring pressed plunger 207 mounted in the block 204. The block is provided with an abutment face 208 which is adapted to engage the screw stud 185 and thereby rock the stop plate 187 counterclockwise against the bias of a spring 209 near the end of the cocking stroke. Counterclockwise movement of the plate is limited by a stop screw 210 on the frame casting which lies in the path of a shoulder 211 formed on the stop plate. The plate is provided with a second shoulder 212 (FIGS. 5 and 7) which is adapted to engage against a frame stud 213 on which a pair of pawls 214 and 215 are pivoted. The shoulder 212 thus limits clockwise rotation of the stop plate on the boss 190 under the influence of spring 209.

The pawl 214 (FIG. 6) is a holding pawl which prevents counterclockwise rotation of the indexing disc when the driving pawl 205 ratchets over the teeth 184 on the counterclockwise or cocking stroke of the mechanism. The pawl 215 (FIG. 8) is a positioning pawl which stops the disc 183 at the end of the clockwise or indexing stroke. The end of the pawl 215 is held snugly against the finished surface 179 of a tooth on the disc by the hydraulic pressure acting on the rack piston 182 which urges the driving pawl 205 clockwise as viewed in FIG. 1. Thereby the surface 179 on the tooth is always held pressed against the end of pawl 215 except during a cycle of operation of the mechanism.

The pawls 214 and 215 are urged into engagement with the teeth of the disc by springs 216. The pawl 215 lies partly over the disc 183 and partly over a mask 217 (FIG. 4) which is secured to the flange 191 of the pinion sleeve 192 (FIG. 9). The mask is provided with a cam notch 218 (FIG. 8) which cooperates with a sloping face 219 on the pawl 215 and thereby lifts the pawl out of the teeth of the disc when the pinion sleeve 192 is rotated counterclockwise on the cocking stroke. The pawl is held disengaged by the peripheral surface of the mask 217 until near the end of the clockwise indexing stroke when the pawl again enters the cam notch 218 and stops further clockwise rotation of the indexing disc.

Secured to the rear end of the shaft 196 (FIG. 9) is a gear 224 which meshes with a smaller gear 225 formed on the end of a sleeve 226 which is journaled in a bore in the frame casting 180 by bearings 227. Mounted for rotation within the sleeve 226 is a drive shaft 228 to which is keyed a knurled knob 229. The end of the shaft adjacent the knob is tapped to receive a screw 230 which, when tightened, presses a washer 231 against the bottom of a counterbore formed in the end of the knob. The other end of the shaft 228 is provided with a flange 232 which bears against the bottom of a counterbore provided in the gear 225. Thereby, when the screw 230 is tightened, the knob 229 and sleeve 226 are clamped together and caused to rotate as a unit by reason of frictional engagement between the right hand end of the knob and the left hand end of the sleeve. Thus, rotation of the gear 225 by gear 224 will cause rotation of the drive shaft 228. However, by loosening the screw 230 it is possible to rotate the shaft 228 by knob 229 independently of the gears 224 and 225 and thus adjust the angular position of the drive shaft 228 with reference to the disc 183. In this manner it is possible to adjust the starting positions of the headstock spindles with the index mechanism in its home position.

Associated with the indexing mechanism are three limit switches 5LS, 6LS and 7LS which are supported on a mounting plate 235 secured to bosses 236 (FIG. 4) formed on the frame casting 180. The limit switch 5LS is disposed with its operating plunger overlying the pawl 215 as shown in FIGS. 4 and 8. Thus, when the pinion sleeve 192 is rotated counterclockwise on the cocking stroke, the mask 217 will lift the pawl 215 and hold the limit switch 5LS operated until the end of the clockwise indexing stroke when the pawl reenters the notch on the disc. The limit switch 6LS is positioned in alignment with the stop plate 187 with its plunger received in a camming notch 238 (FIG. 5) formed in the plate. Hence, when the plate is rotated counterclockwise at the end of the cocking stroke, the cam surface of the notch will momentarily operate the limit switch 6LS. The limit switch 7LS is located above a single lobe cam 239 (FIG. 4) secured to the face of the gear 224, the cam being effective to hold the switch operated when the indexing mechanism is in its home position. When the indexing mechanism is operated at the end of the first sub-cycle, i.e., after the first flute has been cut in the workpieces, the limit switch 7LS will be released and will not again be operated until the end of the automatic cycle, i.e., after all of the flutes have been cut.

The indexing mechanism described above operates as follows: When the rack piston 182 is moved to the right as viewed in FIG. 7, the driving pawl 205 will be rocked counterclockwise and ratchet over the teeth 184 of the indexing disc 183. The disc will be held against counterclockwise rotation by the holding pawl 214 (FIG. 6) and the positioning pawl 215 (FIG. 8) will be cammed out of engagement with the teeth by the mask 217. When the abutment face 208 on the block 204 contacts the screw stud 185, the stop plate 187 will be rocked counterclockwise to move the shoulder 211 into engagement with the screw stud 210. Further rotation of the driving pawl 205 is thereby prevented and a signal is provided by limit switch 6LS to return the rack piston 182 toward the left as viewed in FIG. 7. On the return stroke of the piston, the driving pawl 205 will return the disc 183 clockwise until the pawl approaches the position shown in FIG. 7 when the notch 218 (FIG. 8) in the mask will permit the positioning pawl 215 to drop into engagement with a tooth on the indexing disc and thereby positively stop the disc and hold it in the position shown in FIG. 7.

The indexing mechanism may be located in any convenient position on the machine and, in the preferred embodiment, is mounted in a housing 240 (FIG. 1) which is secured to the outboard brace 241 of the machine. Access to the indexing mechanism is provided by a hinged door 242 which is apertured to permit the manual adjustment knob 229 to project therethrough so as to be readily accessible to the operator.

*Hydraulic Circuit*

The portions of the hydraulic circuit which are necessary for an understanding of the present invention are shown in FIGS. 3*a* and 3*b*. Hydraulic fluid under pressure is supplied to the system by a pair of pumps 250 and 251 which are driven by suitable motors connected thereto (not shown). The pump 250 withdraws fluid from a reservoir 252 and delivers it to a high pressure line 253 whence it is delivered through suitable control valves to the hydraulic motor 103 which effects traversing movements of the table 102 as previously described. The fluid in line 253 in maintained at a predetermined constant pressure by means of a relief valve 254 which exhausts excess fluid into the reservoir 252.

The pump 251 like the pump 250, withdraws fluid from the reservoir 252 and delivers it at a pressure determined by the setting of a relief valve 255 to a pressure line 256. From this line it is delivered through suitable control valves to the hydraulic cylinder 106 for operating the spindle carrier, to the hydraulic motor 124 (FIG. 3*b*) for operating the headstock spindles, and to a hydraulic motor 257 (FIG. 3*a*) which operates the depth tracer.

Operation of the table motor 103 is controlled by a solenoid operated valve 260 which in turn controls a reversing valve 261 for the motor. The pilot valve 260 is provided with a spool 262 which is normally held in a centered position as shown in FIG. 3*a* by centering springs 263. The spool may be shifted in either direction from the central position by selective energization of solenoids 1SOL and 2SOL. Right hand movement of the table is controlled by solenoid 1SOL and, when this solenoid is energized, the valve plunger 262 will be shifted to the left as viewed in FIG. 3*a* thereby connecting the pressure line 253 with a pilot line 265 which is connected to the right hand end of the reversing valve 261. At the same time a pilot line 266, which is connected to the left hand end of valve 261 will be placed in communication with an exhaust line 267 which is connected through a check valve 268 with a main exhaust line 269 which connects with the reservoir 252. When pressure is thus applied to the right hand end of reversing valve 261, its plunger 270 will be shifted to the left thereby connecting the pressure line 253 with a motor line 271. At the same time, a motor line 272 will be connected to an exhaust line 273 which is connected through a line 274 with the inlet port of a pressure regulating valve 275. The discharge port of valve 275 is connected by a line 276 with the inlet port of a rate valve 277 which meters the flow of fluid into a discharge line 278 emptying into the reservoir 252.

When pressure is applied to motor line 271 and motor line 272 is connected to exhaust through the pressure regulating and rate valves 275 and 277, the motor will be operated in a direction to move the table 102 to the right. If table movement to the left is desired, the solenoid 2SOL is energized thereby shifting the plunger 262 to the right so as to connect pilot line 266 to the pressure line 253 and pilot line 265 to the exhaust line 267. Pressure will thus be applied to the left hand end of plunger 270 of the reversing valve 261 and the plunger will be shifted to the right thereby connecting the pressure line 253 to the motor line 272 while the discharge line 273 will be connected with the motor line 271. This will cause reversal of the hydraulic motor 103 and cause the table 102 to be moved to the left.

The motor lines 271 and 272 are communicatively connected to the motor 103 through a high speed-low speed valve 280. When the valve is in the position shown in FIG. 3*a*, the motor line 271 will be in communication with lines 281 and 282 leading to the motor 103 while the motor line 272 will be in communication with lines 283 and 284 running to the motor. The construction of the motor 103 is such that when hydraulic fluid is delivered to the motor and exhausted therefrom through the dual lines 281, 282, and 283, 284, the motor will operate at high capacity and low speed. However, when pressure is applied to the left hand end of plunger 285 of valve 280 by pilot pressure applied through a line 286, the plunger will be moved to the right and lines 282 and 284 will be blocked by the valve while lines 281 and 283 will remain communicatively connected with motor lines 271 and 272, respectively, by annular grooves provided in the valve body for this purpose. Under these conditions, hydraulic fluid will now be delivered to the motor and exhausted therefrom through the single lines 281 and 283 thereby causing the motor to operate at low capacity and high speed.

Rapid traverse of the table is controlled by a solenoid operated valve 290. This valve is fitted with a spool 291 which, in the position shown, communicatively connects the pressure line 256 with a pilot line 292 which is connected to the left hand end of a hydraulically operated by-pass valve 293. At the same time, the pilot line 286 which is connected to the right hand end of the by-pass valve 293, will be connected by the valve 290 with the main exhaust line 269. Thereby, a spool 294 of the by-pass valve will be maintained in its right hand position as shown in FIG. 3*a* so as to compel return fluid from the motor 103 in line 273 to pass through the pressure regulating valve 275 and rate valve 277. However, when a solenoid 5SOL is energized thereby shifting the spool 291 of the rapid traverse valve to the right, pressure from line 256 will be supplied to pilot line 286 while the pilot line 292 will be connected to the exhaust line 269. Thereby, pressure will be applied to the right hand end of by-pass valve 294 while the left hand end of this valve will be connected to exhaust. Hence, the spool 294 of the valve will be shifted to the left thereby connecting the line 274 with a by-pass line 295 which is connected to reservoir through the line 278. The rate valve 277 will thereby be by-passed, and return flow from the motor 103 will pass unrestricted to the reservoir. At the same time, the high speed-low speed valve 280 will be shifted to the right so as to block the lines 282 and 284 and cause the motor 34 to operate at low capacity and high speed. The direction of travel of the table in rapid traverse will be controlled, as before, by the pilot valve 260, movement to the right being effected by energization of solenoid 1SOL and movement to the left being effected by energization of solenoid 2SOL.

The flow of hydraulic fluid to and from the carrier motor cylinder 106 is controlled by an electro-magnetically operated valve 300. This valve is fitted with a spool 301 which is normally held in a centered position as shown in FIG. 3*a* by a bow spring 302. The spool 301 may be shifted in one direction or the other in accordance with the magnitude and direction of flow of energizing current through a coil 303 mounted on the left hand end of the spool. The coil is situated in a magnetic field provided by a permanent magnet 304 so as to produce a force on the coil when the latter is energized. The valve 300 is provided with a central pressure port to which the pressure line 256 is connected, a pair of exhaust ports to which the exhaust line 269 is connected, and a pair of intermediate ports to which the motor lines 305 and 306 are connected. The motor line 305 is connected to the upper end of the cylinder 106 while the motor line 306 is connected through a mechanically operated by-pass valve 307 to a line 308 connected with the bottom of the cylinder 106. The movement of the spindle carrier is thereby controlled in accordance with the energization of the moving coil 303 of valve 300, this valve forming one element of a servo-mechanism which will be described in a later portion of this description.

Mounted on the spindle carrier 105 is a dog 310 which is adapted to engage the end of spool 311 of the by-pass valve 307 and cam the spool to the right against the urgency of a spring 312 as the carrier approaches the bottom of its downward stroke. When the spool is shifted to the right, the line 308 will be disconnected from direct communication with the line 306 and a rate valve 313 will be introduced into the circuit. Thus, the line 308 will be connected to a line 314 which connects with the inlet port of rate valve 313. The discharge port of the rate valve is connected by a line 315 with the line 306 from whence the return fluid from the cylinder 106 passes through the valve 300 and into the exhaust line 269. Thus, the feed rate of the carrier toward the work will be reduced in accordance with the setting of the rate valve 313 as the milling cutters move into contact with the workpieces.

When the spindle carrier is to be elevated so as to remove the cutters from the workpieces, fluid under pressure from line 256 may flow through the motor line 306 and thence through the valve 307 and a check valve 316 into the bottom of the cylinder 106. Hence, the by-pass valve is effective only during downward movement of the carrier and will not enforce flow of fluid through the rate valve 313 during upward movement of the carrier even though the dog 310 holds the spool 311 in its right hand position. The spindle carrier may therefore move rapidly to its raised position.

Movement of the tracer roll 137 into contact with the depth cam 138 is controlled by the hydraulic motor 257. As shown in FIG. 3*a*, the motor is operatively connected with the stem 136 of the tracer by a pinion 320 on the motor shaft which meshes with a rack 321 on the stem. Operation of the motor 257 is controlled by a solenoid operated valve 322 having a spool 323 which is adapted to be operated in one direction or the other by solenoids 3SOL and 4SOL. The valve spool is detented in either of its moved positions by a spring pressed plunger 324 which cooperates with a flange 325 formed on the right hand end of the spool. Thus, the spool will always remain in the position to which it was last moved by one of the solenoids until the other solenoid is energized to reverse the position of the valve. Hydraulic fluid under pressure for operating the motor 257 is derived from the pressure supply line 256 which is connected through a pressure reducing valve 326 to the central pressure port of the valve 322. The end ports of the valve are connected by a line 327 and a check valve 328 to the main exhaust line 269. Intermediate ports on the valve are connected to motor lines 329 and 330 which convey fluid to and from the motor 257.

In the position of the valve 322 shown in FIG. 3*a*, the solenoid 4SOL has been energized to shift the spool 323 of the valve to the left thereby connecting the motor line 329 with pressure to operate the motor 257 in a direction to move the roll 137 into contact with the depth cam 138. The motor will thus continuously bias the roll into contact with the cam during movement of the table to the left so as to effect tracing of the cam during movement of the table. When it is desired to raise the spindle carrier, the solenoid 3SOL is energized to shift the spool 323 to the right and thereby supply fluid under pressure to the motor line 330 which will drive the motor in the opposite direction and remove the roll from the cam. The carrier will follow the movement of the tracer through a servo-mechanism hereinafter to be described.

As shown in the upper right hand corner of FIG. 3*a*, the tracer roll 131 of the lead tracer is maintained in engagement with the lead cam 132 by a gravity operated mechanism including a biasing weight 331 connected by a cable 332 running over pulleys 333 with the plunger 130 of the lead tracer. The roll 131 will thereby always be urged into contact with the cam 132 and will follow the surface of the cam during movement of the table in either direction.

As shown in FIG. 3*b*, rotation of the headstock motor 124 is controlled by an electro-magnetically operated valve 340 which is similar in construction to the valve 300 previously described. The valve is fitted with a spool 341 which is operated by a moving coil 342 to which energizing current is supplied from a servo-amplifier forming a part of the lead servo-mechanism. Fluid under pressure is supplied to the central port of the valve from the pressure line 256 while the exhaust ports of the valve are connected to the exhaust line 269 as shown. The intermediate motor ports of the valve are connected to motor lines 343 and 344 which deliver fluid to and from the hydraulic motor 124 mounted on the headstock in the manner previously described. Also, as shown in FIG. 3*b*, there is provided a solenoid operated valve 345 which controls the operation of the rack piston 182 for the indexing mechanism. The valve 345 has a spool 346 which is normally held in its right hand position by a biasing spring 347. However, when a solenoid 6SOL is energized, the spool will be shifted to the left against the urgency of the spring. Fluid under pressure is supplied to the valve from the pressure line 256 through a pressure reducing valve 348 and a pressure supply line 349. The exhaust ports of the valve are connected by lines 350 and 351 with the main exhaust line 269. The motor ports of the valve are connected by lines 352 and 353 with the opposite ends of the cylinder 181 within which the rack piston operates. When the solenoid 6SOL is deenergized as shown in FIG. 3*b*, the pressure line 349 is in communication with the motor line 352 while the motor line 353 is connected to exhaust line 351. Hence, the piston 182 is held in its left hand position with the driving pawl 205 of the indexing mechanism holding a tooth 184 of the indexing disc firmly against the end of the positioning pawl 215 as shown in FIG. 7. When solenoid 6SOL is energized, the spool 346 is shifted to the left thereby connecting the pressure line 349 with the motor line 353 to supply fluid under pressure to the left hand end of the cylinder 181. At the same time, the motor line 352 will be connected to the exhaust line 350 thereby permitting fluid to escape from the right hand end of the cylinder. Accordingly, the piston 182 will be shifted to the right to effect cocking of the indexing mechanism. After the mechanism is cocked, the solenoid is deenergized by limit switch 6LS thereby causing return movement of the piston 182 to the left to effect indexing of the headstock spindles through the lead servo-mechanism as will hereinafter be described.

*Depth and Lead Servo-Mechanisms*

In FIGS. 10 and 12 are shown block diagrams of the servo-mechanisms utilized for controlling the spindle carrier and headstock spindles under the control of the depth tracer and lead tracer, respectively. As shown in FIG. 10, the depth cam 138 drives a synchro transmitter CX through the depth tracer which is adapted to follow the contour of the cam. The synchro transmitter is energized with 400 cycle A.C. from an oscillator 365 which also delivers current to a depth servo-amplifier 366 for phase comparison purposes. The signal from the synchro transmitter CX is passed through a synchro differential transmitter CDX to a receiver or control transformer CT which is mechanically driven from the spindle carrier 105. Any discrepancy between the position of the control transformer and that of the synchro transmitter results in an error signal which is delivered to the depth servo-amplifier 366 which compares the phase of the signal with the voltage from the 400 cycle oscillator and converts it into a D.C. output signal which is either positive or negative in accordance with the phase of the error signal. The output from the servo-amplifier is used to energize the moving coil valve 300 which in turn controls the operation of the hydraulic cylinder motor 106 for the spindle carrier 105. The spindle carrier is thereby caused to follow the movements of the depth tracer as the latter is translated by the depth cam 138.

The servo control for the headstock spindles is shown in the bottom portion of FIG. 10 and is similar to the depth servo-mechanism just described. Briefly, the lead cam 132 drives a synchro transmitter CX which is associated with the lead tracer and the signal from the transmitter is passed through a synchro differential transmitter CDX to a receiver or control transformer CT. The error signal from the control transformer is amplified and rectified by the servo-amplifier 367 and applied to the moving coil valve 340 which controls the hydraulic motor 124 for the headstock 121.

The connections of the synchros are shown schematically in FIG. 12, the depth control synchros being shown in the upper part of the figure and the lead control synchros being shown in the bottom part thereof. It will be noted that a coarse-fine synchro system is utilized in both cases to provide the high degree of accuracy required in the positioning of the spindle carrier and the headstock spindles. The depth control system includes a fine synchro transmitter CX–1 which, as diagrammatically illustrated in FIG. 3*a*, is driven by the plunger 136 of the depth tracer through a ball-nut and screw mechanism 368 which is geared to the rotor of the synchro transmitter CX–1. The rotor of the coarse synchro transmitter CX–2 is driven from the rotor of the fine synchro through reduction gearing 369.

As indicated in FIG. 12, the stators of the synchro transmitters are connected to the stators of fine and coarse synchro differential transmitters CDX–1 and CDX–2, respectively, the rotors of which are adapted to be turned by a hand wheel 370. A gear reduction drive corresponding to the gear reduction 369 is provided between the rotors of the fine and coarse synchro differential transmitters. The differential synchros and the hand wheel 370 may, for convenience, be mounted in the upper part of the housing 240 which contains the indexing mechanism as shown in FIGS. 1 and 2.

The rotors of the differential synchros are electrically connected to the stators of control transformers CT–1 and CT–2 which are contained in a housing 371 (FIG. 2) mounted on the bed of the machine adjacent the spindle carrier 105. Referring to FIG. 3*a*, it will be seen that the control transformers are driven from the spindle carrier by a ball-nut and screw mechanism 372 with a gear reduction drive 373 interposed between the transformers to cause them to rotate in the same speed ratio as the synchro transmitters and synchro differentials. Error signals from the control transformers are fed to a synchro switching unit 374 which delivers the error signal from either the fine transformer CT–1 or the coarse transformer CT–2 to the depth servo-amplifier 366 depending upon the magnitude of the error signal. The output from the servo-amplifier is then applied to the moving coil 303 of the servo valve 300 as previously described in connection with FIG. 10. The hand adjustment provided by the hand wheel 370 enables the spindle carrier to be adjusted up or down independently of the control exerted by the depth tracer for enabling initial positioning of the cutters to be made relative to the workpieces.

The synchro system utilized in connection with the lead tracer is of similar nature and includes a fine synchro transmitter CX–3 and a coarse synchro transmitter CX–4 the rotors of which are driven by a ball-nut and screw mechanism 375 (FIG. 3*a*) with a suitable gear reduction 376 provided between the rotors of the fine and coarse transmitters.

As shown in FIG. 12, the stators of the transmitters are connected to the stators of fine and coarse synchro differential transmitters CDX–3 and CDX–4 which are contained in the housing 240 with the indexing mechanism and are driven therefrom through the gear 225 (FIG. 3*b*) with a suitable gear reduction drive 377 interposed between the fine and coarse units. The rotors of the synchro differential transmitters are electrically connected to the stators of the control transformers CT–3 and CT–4 which, as shown in FIG. 3*b*, are driven from the motor 124 through gearing 378 with a gear reduction drive 379 interposed between the fine and coarse transformers. Referring again to FIG. 12, the error signals from the control transformers are led into a synchro switching unit 380 which selects the signal from one or the other of the transformers for transmittal to the lead servo-amplifier 367. Here the error signal is rectified and amplified and delivered to the moving coil 342 of the servo-valve 340 for the headstock motor 124. It will thus be seen that the headstock spindles will be rotated in accordance with the movement of the lead tracer by the lead cam 132 but that independent movement of the headstock spindles may be introduced by the indexing mechanism to advance the workpieces at the end of each cut to position them for the next flute to be machined. Additionally, the headstock spindles may be adjusted by the hand knob 229 in order to rotate the headstock spindles to the correct starting position at the commencement of the machining cycle.

*Programming and Cycle Control Mechanism*

The controls for effecting automatic cycling of the machine and the means for preselecting the order in which the various machine functions shall occur during the automatic cycle are shown in FIGS. 13*a*, 13*b*, 13*c* of the drawings. In discussing the circuitry therein shown, it will be assumed that the automatic cycle is of the type shown diagrammatically in FIG. 11. In this figure, the starting point of the cycle is indicated by reference numeral 385. The cycle is begun with the carrier up and the table all the way to the right. In this position of the parts, a dog 386 (FIG. 3*a*) on the spindle carrier is on a limit switch 3LS and a dog 387 on the table is on a limit switch 2LS. In the first part of the cycle, the table rapids to the left as indicated by the arrow 388 in FIG. 11 until a pivoted dog 389 (FIG. 3*a*) on the table operates limit switch 2LS and slows the table to a feed rate as indicated by the zig zag line 390 in FIG. 11. Thereafter, a dog 391 (FIG. 3*a*) on the table operates limit switch 4LS to stop movement of the table and initiate rapid down movement of the carrier as indicated by the arrow 392 in FIG. 11. As the cutters approach the workpieces, the dog 310 on the carrier operates plunger 311 of by-pass valve 307 and slows the carrier to a feed rate as signified by the zigzag line beneath the arrow 392. The carrier is stopped when the tracer roll 137 contacts the cam 138, and a dog 393 on the carrier is adjusted to operate limit switch 1LS just prior to stopping of the carrier. With the cutters engaging the workpieces, the table is moved to the right at a feed rate to mill the flute with a lead as determined by the cam 132 and a taper as determined by the cam 138. As the table moves to the right, the pivoted dog 389 passes idly over the limit switch 2LS and the table continues to feed right until dog 387 operates limit switch 2LS. The table is then stopped and the carrier is raised in rapid traverse as indicated by arrow 394. The upward limit of carrier movement is determined by the extent of movement of the tracer stem away from the cam 138. Such movement of the stem may be limited by a mechanical stop to thereby determine the raised position of the carrier. As the carrier moves into its raised position, the dog 386 operates limit switch 3LS to initiate indexing of the headstock spindles so as to rotate the workpieces into position for cutting the next flute therein. The cycle is then automatically repeated as many times as necessary to cut the desired number of flutes. After all of the flutes have been cut and the headstock spindles have been indexed to their starting positions with the cam 239 on limit switch 7LS, the machine will stop to permit the finished workpieces to be removed and fresh workpieces inserted ready for the next machining cycle.

In the wiring diagram, which comprises FIGS. 13*a*–13*c*, of the drawings, the various control relays and solenoids are connected across energizing conductors 4 and 8 which are extended from one sheet of drawings to the next. The lines of the wiring diagram are numbered along the left hand margin to provide a convenient means for locating the various relays and their contacts. To the right of each relay are numbers indicating the location of its contacts in the wiring diagram, the underscored numerals designating normally closed contacts.

To set up the machine for the type of cycle, shown in FIG. 11, a series of seven selector switches 1SW to 7SW, inclusive, which are shown in FIG. 13*a* of the wiring diagram, are set to the positions shown in the drawing. Each selector switch has seven contacts, shown in vertical alignment in FIG. 13*a*, and a rotor for selecting one of the seven contacts. As shown in the figure, the rotors of switches 1SW–7SW are designated by reference numerals 81–87, respectively. Each contact of each switch controls a separate function as indicated by the legends listed vertically along the right hand margin of FIG. 13*a*.

As the machine operates, the switches are selected in sequence from 1SW to 7SW to cause the type of cycle set up by the switches to be carried out by the machine. The sequential selection of the switches 1SW to 7SW is effected by a stepping switch 1SS (50). This switch is a 2-bank rotary telephone type switch of conventional design which is available commercially from suppliers of automatic telephone equipment. Each bank of the switch includes a rotary wiper blade which is moved, always in the same direction, from one stud to the next by a pawl and ratchet device. As shown in FIG. 13*a*, studs 78 of the first bank are associated with a rotary wiper blade 76 while studs 79 (FIG. 13*c*) of the second bank are associated with a rotary wiper blade 77. Upon energization of the switch solenoid, a pawl is moved by an armature to pick up the next tooth of a ratchet wheel moving with the wiper blades. When the relay is de-energized, a driving spring restores the pawl and, in so doing, advances each wiper blade to the next stud in the bank. The stepping switch includes "make" and "break" interrupter contacts 397 (46) and 398 (49) which close and open, respectively, when the coil is energized. The switch also includes off normal make contacts 399 (40) and 400 (49), and off normal break contacts 401 (35) which close and open, respectively, when the wiper blades move away from home position.

As a preliminary to the start of an automatic cycle, a switch 395 (9) is closed thereby connecting the conductors 4 and 8 to a suitable source of energizing current applied to terminals 396. To further prepare the machine for an automatic cycle, the switch 402 in line 11 is turned to the "Auto" position thereby energizing relay 3CR and closing the normally open contacts of this relay in lines 21, 40, and 50 of the wiring diagram. The last-mentioned contacts will, if the stepping switch 1SS should happen to be out of its home position, cause the coil of the stepping switch to be energized since the off normal make contacts 400 (49) of the stepping switch will be closed whenever the rotor of the switch is out of home position. Hence, the interrupter break contacts 398 (49) will open and deenergize the coil thereby stepping the wiper blades ahead to the next set of studs. When the coil is deenergized, the interrupter break contacts 398 will again close and reenergize the coil which will again break its own circuit. This action will continue until the stepping switch reaches the home position where the off normal make contacts 400 (49) will open and stop further stepping of the switch.

Assuming that the stepping switch is in its home position and that table dog 387 is on limit switch 2LS and that carrier dog 386 is on limit switch 3LS then, for reasons which will become evident as the description proceeds, relays 17CR (27) and 19CR (30) will be energized and the contacts of these two relays in line 21 will be closed.

The off normal break contacts 401 in line 35 will now be closed thereby energizing relay 22 which will close its normally open contacts in lines 21 and 55. Since relay 29CR (45) is energized whenever the indexing mechanism is in its starting or "0" position with cam 239 on limit switch 7LS, depression of a cycle start push button 403 in line 21 will energize relay 13CR and close the normally open contacts of this relay in lines 12, 22, 47 and 55 and open the normally closed contacts thereof in line 50. Accordingly, the relay will be locked in around the push button 403 by the 13CR contacts in line 22 and will remain energized throughout all of the sub cycles until the normally closed contacts 32CR open at the end of 360° of indexing movement as determined by limit switch 7LS. When the normally open contacts of relay 13CR in line 55 close, the stepping switch 1SS will be energized and close the interrupter make contacts 397 in line 46. This will energize relay 30CR and close the normally open contacts of this relay in line 37. Relay 23 will thereby be energized and cause relay 22CR to be deenergized due to opening of the normally closed contacts 23CR in line 35. When relay 22CR is deenergized, the stepping switch 1SS will be deenergized, due to opening of contacts 22CR in line 55, and the wiper blades 76 and 77 will be advanced to the first set of studs 78 and 79. At the same time, the off normal break contacts 401 in line 35 will open thereby deenergizing relay 23CR.

When the stepping switch 1SS is moved to its first position, the rotor 81 (FIG. 3*a*) of switch 1SW, which is connected by a conductor 74 to the first stud 78, will be connected by the wiper blade 76 of the stepping switch to conductor 37. This completes a circuit from conductor 8 through contacts 17CR (14), 30CR (13), 4LS (12), 13CR, 27CR, conductor 37, wiper blade 76, rotor 81, conductor 44 and relay winding 7CR to line 4. When relay 7CR is thus energized, the normally open contacts of this relay in lines 15 and 17 are closed thereby energizing solenoid 2SOL and relay 9CR. The normally open contacts of relay 9CR in line 57 are thereby closed and solenoid 5SOL is energized. Spool 262 of valve 260 (FIG. 3*a*) is accordingly shifted to the right by solenoid 2SOL to cause motor 103 to move the table to the left, and spool 291 of valve 290 is shifted to the right by solenoid 5SOL to put the table in rapid traverse to the left. When the table moves off of limit switch 2LS, relay 17CR is deenergized due to opening of contacts 2LS in line 26. The normally open contacts 17CR in line 14 thereupon open but at the same time the contacts 2LS in line 12 close to maintain the solenoids 2SOL and 5SOL energized. As the table approaches the end of its left hand travel, limit switch 2LS is operated by the pivot dog 389 (FIG. 3*a*) on the table. This opens the contacts 2LS in line 12 and deenergizes solenoid 2SOL momentarily. At the same time, the contacts 2LS in line 26 close and energize relay 16CR which closes its contacts in line 52. This energizes stepping switch 1SS and closes interrupter make contacts 397 in line 46 to energize relay 30CR. Contacts 30CR in line 28 are thereby closed to energize relay 17CR and deenergize relay 16CR. Stepping switch 1SS is thereby deenergized by opening of contacts 16CR in line 52 and the wiper blade 76 is advanced to the next stud 78 which is connected by conductor 80 with the rotor 82 of selector switch 2SW. Since this switch is set for table feed left, conductor 37 is connected by conductor 41 with the winding of solenoid 2SOL. Since relay 17CR is now energized, the contacts of this relay in line 14 are closed thereby completing the circuit through solenoid 2SOL. Since relays 7CR and 9CR are now deenergized, the rapid traverse solenoid 5SOL will be deenergized and the table will move off of limit switch 2LS at a feed rate until limit switch 4LS is operated by dog 391. When this occurs, contacts 4LS in line 12 will open thereby deenergizing solenoid 2SOL and stopping the table. Since the table is moving at a comparatively slow rate, and since the circuit to the solenoid is broken directly by the limit switch, stopping of the table will occur the instant the dog operates the limit switch and accurate positioning of the table may thus be accomplished.

At the same time, the contacts 4LS in line 32 will be closed and relay 20CR energized to close contacts 20CR in line 54. The stepping switch 1SS will thus be energized as will also relay 30CR which energizes relay 21CR and deenergizes relay 20CR. Stepping switch 1SS will thereby be deenergized and wiper blade 76 will move to the next stud 78 which is connected to the rotor 83 of selector switch 3SW by a conductor 88. Since this switch is set for "Carrier Down," the conductor 37 will be connected with conductor 51 which is connected to the winding of solenoid 4SOL. Since relay 21CR is now energized, a circuit will be completed to solenoid 4SOL from line 8 by means of contacts 2LS (12), 30CR (13), 21CR (14), 13CR (12), 27CR, conductor 37, blade 76, conductor 88, rotor 83, and conductor 51. When solenoid 4SOL is thus energized, spool 323 of valve 322 will be shifted to the left (to the position shown in FIG. 3*a*) to raise the tracer roll 137 toward the cam 138 and thereby move the carrier down toward the work in rapid traverse. As the cutters approach the workpieces, the dog 310 on the carrier will operate valve 307 and insert the rate valve 313 in the return line 308 from the carrier cylinder 106. This reduces the movement of the carrier to a feed rate as the cutters move into the workpieces. Just prior to engagement of the tracer roll with the cam 138, dog 393 on the carrier operates the limit switch 1LS and closes the contacts of this switch in line 23. This energizes relay 14CR and closes its contacts in line 51 to energize stepping switch 1SS. Relay 30CR is thereupon energized to energize 15CR and deenergize relay 14CR which drops out stepping switch 1SS and advances the wiper blade 76 to the next stud 78. This stud is connected by a conductor 89 with the rotor 84 of selector switch 4SW which is set for table feed right. Accordingly, since contacts 2LS in line 12 and contacts 21CR in line 14 are now closed, a circuit will be completed from conductor 8 through conductor 37 and the switch contacts to conductor 43 which is connected to solenoid 1SOL. When this solenoid is energized, spool 261 of the valve 260 is shifted to the left to energize the table motor 103 and cause the table to move to the right at a feed rate. As the table feeds right, the tracer roll 137 follows the cam 138 to control the depth of cut while the tracer roll 131 follows the cam 132 to control rotation of the headstock spindles. A flute of the desired lead and taper will thereby be milled in the work as the table moves to the right.

The movement of the table to the right will be continuous, the pivot dog 389 being arranged to rock about its pivot as it passes over limit switch 2LS on the return stroke without operating the switch. When the dog 387 reaches the limit switch 2LS, the contacts 2LS in line 12 will open and instantly deenergize solenoid 1SOL to stop further movement of the table. At the same time, the contacts 2LS in line 26 will be closed to energize relay 16CR and stepping switch 1SS. Relay 30CR is thereby energized to close its contacts in line 28 and energize relay 17CR. The contacts of this relay in line 26 open thereby deenergizing relay 16CR and stepping switch 1SS which advances the wiper blade 76 to the next stud 78 which is connected by conductor 90 to the rotor 85 of the selector switch 5SW. Since switch 5SW is set to select "Carrier Up," solenoid 3SOL will be connected by conductor 53, switch 5SW and stepping switch 1SS to conductor 37 which is connected by contacts 4LS, 30CR and 17CR to conductor 8. Energization of solenoid 3SOL shifts spool 323 of valve 322 to the right to operate the motor 257 to lower the tracer roll 137 away from the cam 138. The carrier is thereby raised, the check valve 316 permitting free flow of fluid to the cylinder 106 in the reverse direction even though the dog 310 holds the valve 307 operated. Accordingly, the carrier rapids out of the work and onto limit switch 3LS. When contacts 3LS in line 29 close, relay 18CR is energized thereby energizing stepping switch 1SS and relay 30CR. The contacts 30CR in line 31 are thus closed to energize relay 19CR and deenergize relay 18CR and stepping switch 1SS. The wiper blade 76 is thereby advanced to the next stud 78 which is connected by a conductor 92 with the rotor 86 of selector switch 6SW. This switch is set for indexing of the headstock spindles and connects conductor 8 with a conductor 54 through contacts 17CR (14), 30CR, 4LS, 13CR, 27CR, conductor 37 and switches 1SS and 6SW. Since relay 19CR is energized, the contacts 19CR in line 39 are closed as are also the contacts of limit switch 6LS. Hence, relay 24CR will be energized and close its contacts in lines 38 and 40, thereby energizing relay 6CR through the closed contacts 19CR in line 39, conductor 91, and contacts 24CR and 25CR in line 38. Contacts 6CR in line 56 will be closed and energize solenoid 6SOL thereby shifting spool 346 of valve 345 to the left to operate rack plunger 182 and cock the index mechanism. When the indexing mechanism is cocked, limit switch 5LS is operated thereby closing its contacts in line 42 while opening its contacts in line 43. This energizes relay 26CR and closes contacts 26CR in line 43 to lock in the relay around the contacts 5LS in line 42. At the end of the cocking stroke, the stop plate 187 is rocked to operate limit switch 6LS which closes its contacts in line 40 and energizes relay 25CR which is held energized by contacts 25CR in line 41. Although contacts of limit switch 6LS in line 39 are open at this time, relay 24CR is held energized by its contacts in line 40.

When relay 25CR is energized, the contacts 25CR in line 38 open and deenergize relay 6CR thereby deenergizing solenoid 6SOL to release valve 345 which returns rack piston 182 to its starting position. The indexing of the headstock spindles is thus completed bringing the work into position for the next cut. At the end of the indexing stroke, limit switch 5LS is released by pawl 215 thereby closing the contacts 5LS in line 43 and energizing relay 27CR through the closed contacts 24CR (42), 26CR and 5LS (43). Contacts 27CR in lines 12, 35, and 46 are thereby opened and contacts 27CR in line 49 are closed. Closing of contacts 27CR in line 49 energizes stepping switch 1SS which is immediately deenergized by opening of interruptor break contacts 398 (49) and then reenergize and so forth until the stepping switch is returned to home position when off normal make contacts 400 (49) are opened to stop further stepping of the switch. At the same time, the off normal make contacts 399 in line 40 will open thereby dropping out relays 24CR and 25CR since conductor 54 is now deenergized. This opens contacts 24CR in line 42 and drops out relays 26CR and 27CR. Relay 22CR will thereupon be energized through the closed contacts 401, 27CR and 23CR in line 35 and cause its contacts in 55 to close. This will energize stepping switch 1SS and relay 30CR to thereby energize relay 23CR and drop out relay 22CR. Stepping switch 1SS will thereupon be deenergized and step the wiper blades 76 to the first stud 78. The sub-cycle will now be repeated in the same manner as before to cut the next and succeeding flutes in the workpieces.

In the sequence chosen to illustrate the operation of the machine, the selector switch 7SW is not used and the stepping switch 1SS is returned to home position by relay 27CR without stopping on the stud 78 associated with switch 7SW. The rotor 87 of the latter switch may be set in any one of its seven possible positions (herein shown in the "index" position) all of which will be dead in so far as the operation of the machine is concerned. This is due to the fact that the relay 27CR has a pair of normally closed contacts in line 12 which will be open at this time to thereby deenergize conductor 37 and prevent further selection of machine functions by the blade 76 of the stepping switch. In other words, an "index" selection will disable any and all subsequent selections and the stepping switch will return to its home position after indexing.

The stepping switch 1SS is a D.C. operated device and, since the terminals 396 (9) are connected to an A.C. source, a source of direct current is provided for operating the stepping switch 1SS by a rectifier 405 (50) which charges a capacitor 406 (48A) through a current limiting resistor 407. When the stepping switch is energized, the capacitor discharges through the winding of the stepping switch and a parallel connected loading resistor 408 to provide quick and positive operation of the stepping switch.

On the last index, i.e., when the work has been turned through 360°, the limit switch 7LS is returned to the position shown in lines 44 and 45 thereby deenergizing relay 28CR and energizing relay 29CR. Thereupon, the normally closed contacts 28CR in line 48 close and, since relay 31CR is held energized by its contacts 31CR in line 48, the relay 32CR will be energized and open its contacts in line 22. This drops out relay 13CR (21) since relay 27CR is energized at the end of the index thereby causing relay 22CR to be deenergized and to open its contacts 22CR in line 21. When relay 13CR is deenergized, it closes the normally closed contacts 13CR in line 50 which resets stepping switch 1SS to its home position. Relay 22CR will now be energized thereby closing its contacts in line 55 ready to energize the stepping switch when the contacts 13CR (55) are closed upon depression of the "Cycle Start" push button 403 in line 21. The machine will thus be stopped with the index mechanism, stepping switch, carrier and table in their normal or home positions and with relays 17CR and 19CR energized so as to be ready for the commencement of a new machining cycle after the finished workpieces have been removed and new ones placed between centers.

The second bank of the stepping switch is utilized to control the illumination of signal lamps 3LT to 9LT, inclusive, shown in lines 62 to 68, inclusive, of the wiring diagram. These lamps are associated with the selector switches 1SW to 7SW, the lamp 3LT being disposed adjacent the switch 1SW, the lamp 4LT being disposed adjacent the switch 2SW, and so forth. Accordingly, as the stepping switch blade 77 is advanced from one stud to the next, the lamps will be lighted in sequence thereby indicating which phase of the automatic cycle is presently being performed by the machine.

The machine may also be manually operated through a sub-cycle as above described by turning the switch 402 (11) to "Manual" position thereby energizing relay 2CR and closing the normally open contacts of this relay in lines 14, 18, 20 and 38. This enables table left and table right operations to be controlled by push buttons 410, and 411, respectively, rapid movement of the table to be controlled by push button 414, carrier up and carrier down operations to be controlled by push buttons 412, and 413, respectively, and indexing of the work for the next cut to be effected by push button 415 (38). When the latter push button is depressed, the relay 24CR will first be energized thereby closing the contacts 24CR in lines 38 and 38A. The latter contacts will lock in the circuit around push button 415 while the former contacts will energize relay 6CR and thereby operate solenoid 6SOL to cock the indexing mechanism. Limit switch 5LS will be operated and energize relay 26CR which will lock in around the contacts 5LS in line 42. At the end of the cocking stroke, the limit switch 6LS will be operated and energize relay 25CR which will drop out relay 6CR and deenergize solenoid 6SOL thereby returning the rack piston 182 to its home position to effect indexing of the workpieces. The limit switch 5LS will then be released and energize relay 27CR which will open the contacts 27CR in line 38A and drop out relays 24CR, 25CR, 26CR and 27CR to conclude the indexing cycle.

It will be noted that the contacts of limit switch 2LS and 4LS in line 12 are effective to stop the movement of the table when it is moved in either direction under control of the push buttons 410 and 411. This permits precise setting of the table dogs by manual operation of the table onto the limit switches and making such adjustment of the dogs as is necessary to stop the table in the exact position desired. Since the table stopping circuit is the same for manual control as for automatic control, there will be no difference in the positioning of the table under automatic cycle control from that obtained with the manual control.

While the invention has been described in connection with one possible form or embodiment thereof and certain specific terms and language has therefore been used herein, it is to be understood that the present disclosure is illustrative rather than restrictive and that changes and modifications may be resorted to without departing from the spirit of the invention as defined by the claim which follows.

What is claimed is:

In an apparatus for programming a machine tool through an automatic cycle consisting of a plurality of sequentially ordered events, said machine tool having an indexable shaft and means for indexing said shaft from one position to another on each automatic cycle of the machine, the combination of means for controlling the operation of said indexing means including a relay circuit, a source of energizing potential, means for selectively connecting said circuit to said source at a predetermined point in the machine cycle, including a plurality of selector switches each having a selectable tap thereon connected to said relay circuit and a stepping switch for connecting said selector switches to said source in a predetermined sequence, reversible power means for giving said indexing means a cocking stroke and an indexing stroke, a relay connected in said circuit for causing said power means to cock said indexing means when said circuit is energized, a limit switch, means for operating said limit switch at the end of said cocking stroke, and means rendered effective upon the operation of said limit switch to deenergize said relay and cause said power means to give said indexing means an indexing stroke.

References Cited in the file of this patent

UNITED STATES PATENTS

| | | |
|---|---|---|
| 2,427,493 | Bullard | Sept. 16, 1947 |
| 2,734,427 | Goodwin | Feb. 14, 1956 |
| 2,838,963 | Good et al. | June 17, 1958 |
| 2,848,909 | Hill | Aug. 26, 1958 |
| 2,885,910 | Waller | May 12, 1959 |
| 3,009,399 | Waters et al. | Nov. 21, 1961 |
| 3,016,804 | Zankl et al. | Jan. 16, 1962 |